UNITED STATES PATENT OFFICE.

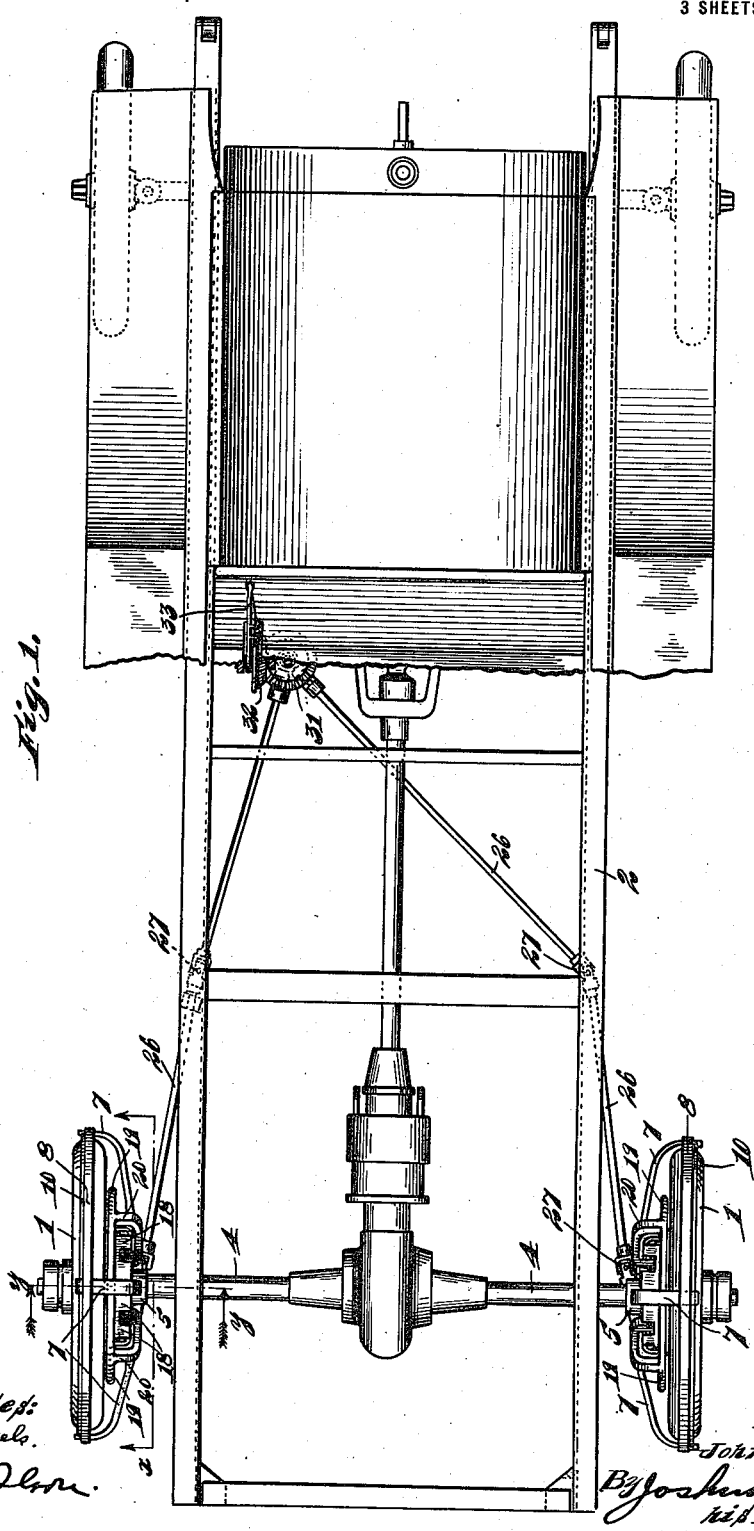

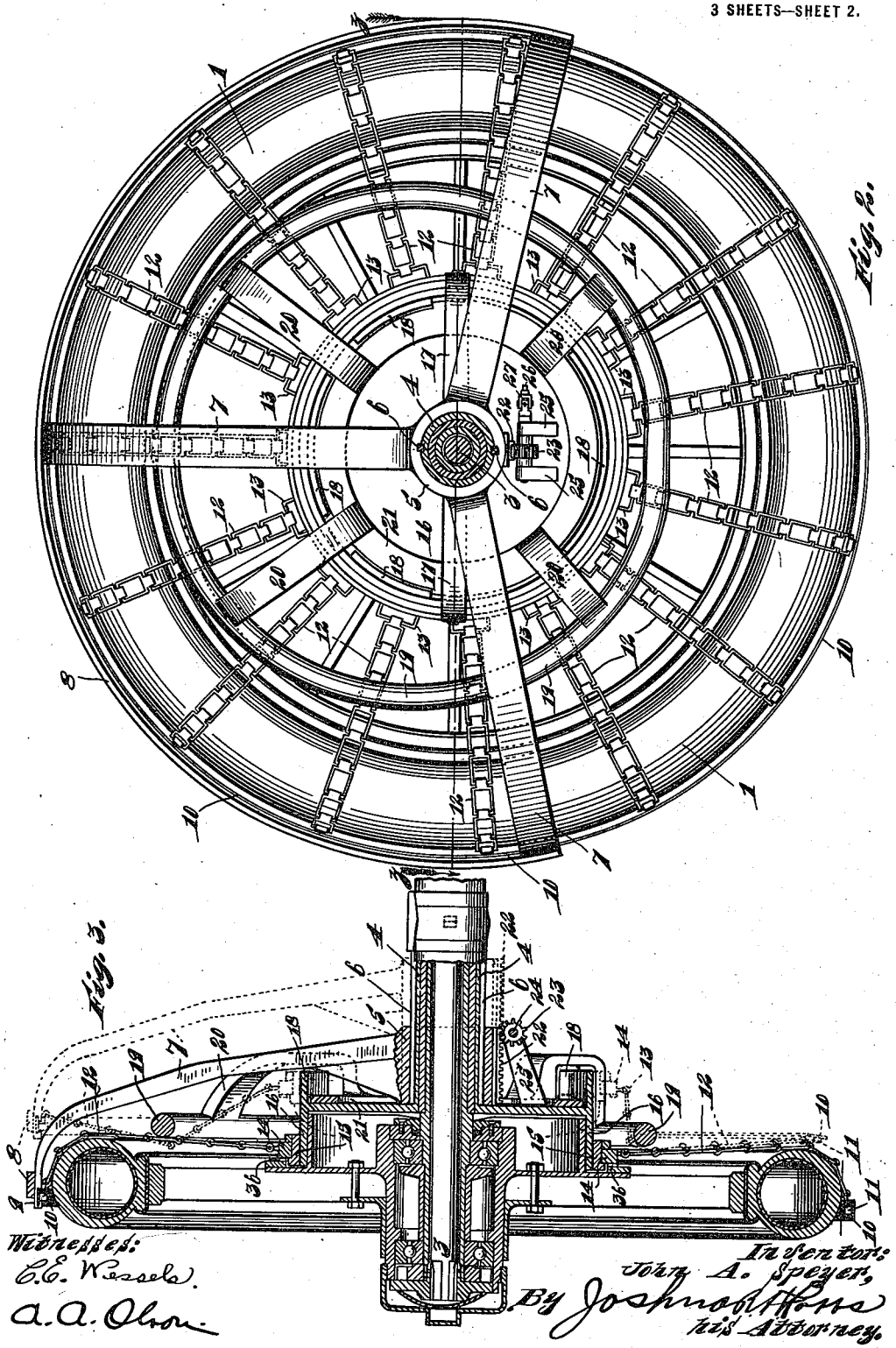

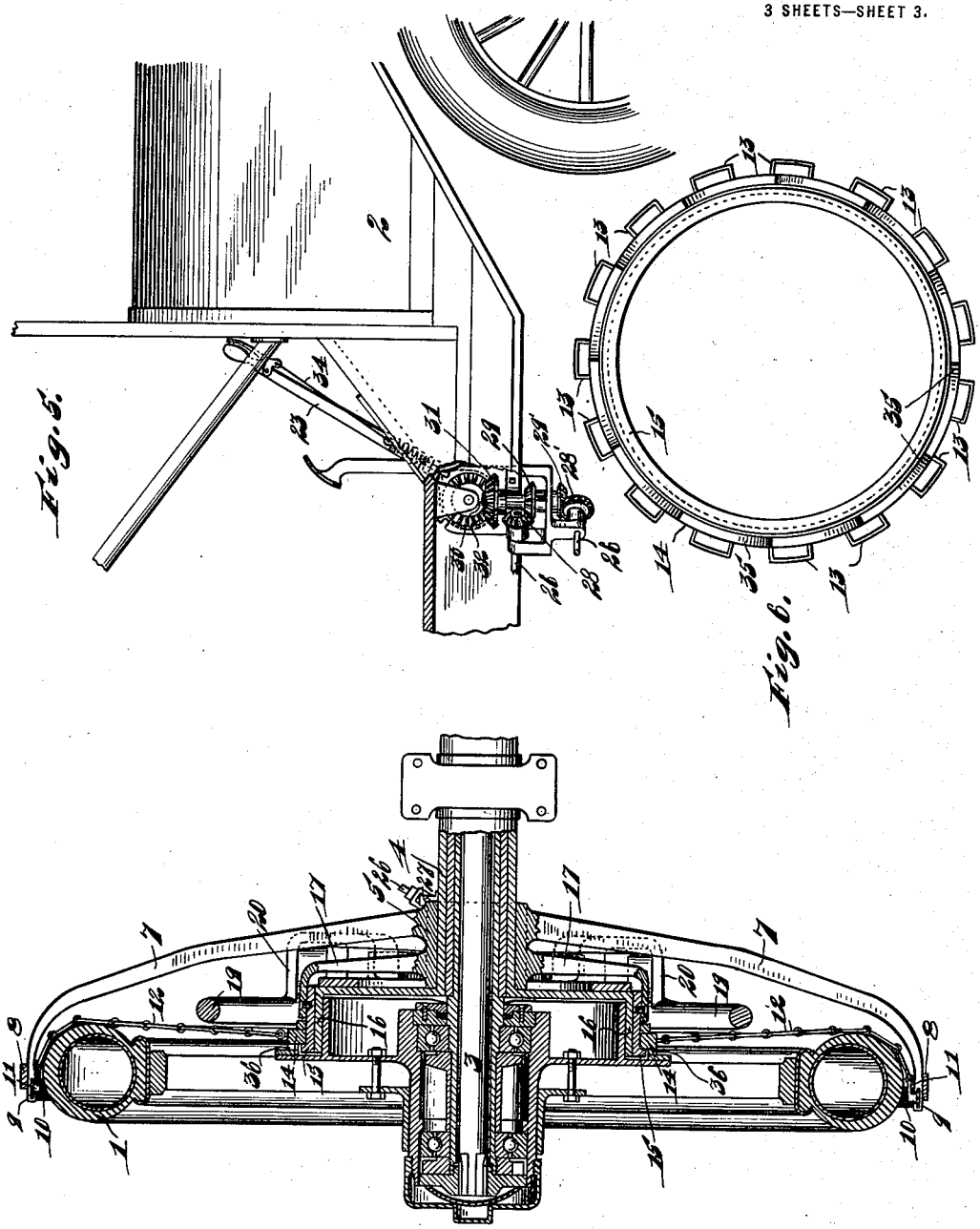

JOHN A. SPEYER, OF CHICAGO, ILLINOIS.

ANTISKIDDING DEVICE FOR VEHICLES.

1,209,062.  Specification of Letters Patent.  Patented Dec. 19, 1916.

Application filed May 29, 1915. Serial No. 31,291.

*To all whom it may concern:*

Be it known that I, JOHN A. SPEYER, a citizen of the United States, and a resident of the city of Chicago, county of Cook, and State of Illinois, have invented certain new and useful Improvements in Antiskidding Devices for Vehicles, of which the following is a specification.

My invention relates to improvements in anti-skid devices for vehicles, and has for its object the production of anti-skid mechanism adapted to be moved into and out of operative relation with the wheels of the vehicle during travel of the latter.

Other objects will appear hereinafter.

The invention consists in the combinations and arrangements of parts hereinafter described and claimed.

The invention will be best understood by reference to the accompanying drawings forming a part of this specification, and in which, Figure 1 is a top plan view of the chassis of an automobile equipped with anti-skid mechanism embodying the invention, Fig. 2 is an enlarged section taken on line *x—x* of Fig. 1, Fig. 3 is an enlarged section taken on line *y—y* of Fig. 1, Fig. 4 is a horizontal section taken on substantially line *z—z* of Fig. 2, Fig. 5 is a fragmental section of the front end portion of the vehicle illustrating the operating mechanism of the device, and Fig. 6 is a side elevation of one of the annular members included in the construction.

The preferred form of construction, as illustrated in the drawings, is shown applied to the rear wheels 1 of a conventional automobile 2, said wheels being connected as is usual with the drive shaft 3 of the automobile which is incased in a stationary tubular housing 4.

Slidably mounted upon each end of the housing 4 is a sleeve 5 held against relative rotation by diametric splines 6. Radiating from each sleeve 5 are arms 7 rigidly connected at their outer ends by a circular connecting strap 8 which is adapted to move transversely of the upper portion of the adjacent wheel in close proximity to the tread thereof, as clearly shown in Fig. 2. The outer ends of arms 7 are formed at their inner sides with channels 9 in which is loosely mounted an endless flexible band 10 of leather. Secured to the inner side of the band 10 are angular fingers or connecting members 11 to which are secured the outer ends of radially disposed chains 12, the inner ends of said chains being loosely connected with elongated loops 13 provided upon the periphery of a ring 14 which is rotatably mounted in a channel ring 15 which is shiftably mounted upon the circular enlargement or drum 16 formed at each end of shaft housing 4. The member 15 is rigidly connected with the corresponding sleeve 5 by means of arms 17, as clearly shown in Fig. 4. In order to permit of the desired shifting of the member 15 upon housing portion 16, the latter is provided at its inner side with extensions 18, as clearly shown in Fig. 3. With the arrangement set forth, it will be seen that shifting of the sleeve 5 will effect simultaneous movement of the arms 7 and 17, and hence corresponding movement of the opposite ends of the corresponding chains 12. Further, the arrangement is such, that upon outward movement of the sleeves 5, that is toward the wheel, the band 10 will be carried past the periphery of the wheel thereby causing the outer ends of the chains connected therewith to be drawn across the tread of the wheel, as clearly shown in Figs. 2 and 3. In this movement of the band 10 and chains 12, the under side of the band and the lowermost chains will contact with the ground, but the same will gradually work their way into engagement with the under side of the wheel as the latter is rotated or moved along the ground, as will be readily understood. When in operative position or in engagement with the tread portion of the wheel, the members 10 and 12 will evidently serve as means for preventing skidding of the vehicle.

Arranged at the inner side of each wheel is a stationary annular stop member 19. Each of said stop members is formed with a plurality of inwardly projecting arms 20 formed integral at their inner ends with an annular plate 21 which is rigidly fastened to the inner side of the corresponding housing 16. The member 19 is so positioned that in the inward movement of the arms 7 and 17 and hence the chains 12 to inoperative position, said chains will contact with said member 19, as clearly shown in dotted lines in Fig. 3, so as to effect the taking up of the slack in said chains. The member 19 is eccentrically arranged with the side thereof closest to the axis of the wheel positioned lowermost. With this arrangement the lower ends of the chains 12 registering with the under side of the wheel will be drawn upwardly far enough to prevent the same dragging upon the ground, it being clear that with this arrangement the lowermost chains will be shortened or taken up to a greater extent than the chains at the upper side of the wheel.

Formed upon the under side of each of the sleeves 5 is a rack 22 with which meshes a pinion 23 fixed to a shaft 24 which is mounted in bearing brackets 25 projecting from the corresponding housing 16. The shafts 24 at opposite sides of the vehicle are operated by shafts 26 in which are interposed universal joints 27 to lend flexibility thereto, as will be readily understood. At the forward ends of the shafts 26 are provided bevel pinions 28 and 28' which mesh with bevel gears 29 and 29' fixed to a vertically disposed shaft 30 mounted in suitable bearings provided at the front end of the vehicle, as clearly shown in Fig. 5. Provided at the upper end of shaft 30 is a bevel gear 31 with which meshes a bevel gear 32 to which is fixed a manually operable lever 33, the arrangement being such that, upon tilting of said lever the shaft 30 will be rotated and effect simultaneous operation of the shafts 26 extending to the sleeves 5 at the opposite sides of the vehicle. Thus, with this arrangement, it will be seen that movement of the anti-skid mechanism into or out of operative relation with the wheels 1 will be effected by simply tilting the lever 33. Also, it will be seen that the construction is such as to permit of the movement of the anti-skid mechanism into or out of operative relation with the wheels of the vehicle during travel of the latter. A pawl and segment mechanism 34 of conventional design coöperates with the lever 33 to lock the same in its positions of pivotal adjustment.

When the bands 10 are moved across the peripheries of the vehicle wheels, the same will, of course, move in unison therewith, such movement being permitted by reason of the loose engagement of said bands with the channels 9. In order to effect movement of the inner ends of chains 12 in unison with the wheels during rotation of the latter and with the outer ends of said chains engaging with the peripheries of said wheels, each of the rings 14 to which the inner ends of said chains are connected, is formed with ratchet teeth 35 which are adapted to interlock with corresponding teeth 36 provided upon the adjacent side of the corresponding wheel, when said ring is at its outer terminal of movement, as clearly shown in Figs. 3, 4 and 6. When the rings 14 are moved inwardly, as is the case when the chains 12 are moved to inoperative position, the teeth 35 automatically move from engagement with the teeth 36 and thus automatically disengage said rings from the vehicle wheels, when the anti-skid mechanism is not in use. Thus, with this arrangement, when the anti-skid mechanism is in inoperative position, the same will be completely disconnected from the wheels and remain absolutely stationary under the car. The loops 13, to which the inner ends of the chains 12 are connected, are comparatively wide, as clearly shown in Figs. 2 and 6 in order to permit of circumferential creeping of the chains upon the treads of the wheels so as to distribute the wear of the chains upon the tires of the wheels, as will be readily understood.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In mechanism of the class described, the combination with a vehicle having a wheel, of a movably mounted annular anti-skid element adapted to encircle said wheel for coöperation therewith; means for moving said element into and out of operative relation with the wheel during travel of the vehicle, said means comprising transversely movable supporting mechanism engaging with said element at the upper side of the wheel and in which said element is rotatably mounted; and means for actuating said supporting mechanism, substantially as described.

2. In mechanism of the class described, the combination with a vehicle having a wheel, of a movably mounted annular anti-skid element adapted to encircle said wheel for coöperation therewith; means for moving said element into and out of operative relation with the wheel during travel of the vehicle, said means comprising a transversely movable supporting frame mounted on the vehicle and having an outer portion formed to pass over the upper side of the wheel in close proximity thereto, said portion engaging with said anti-skid element; and means for moving said frame, substantially as described.

3. In mechanism of the class described, the combination with a vehicle having a wheel, of a movably mounted annular anti-skid element adapted to encircle said wheel for coöperation therewith; means for moving said element into and out of operative relation with the wheel during travel of the vehicle, said means comprising a transversely movable supporting frame mounted on the vehicle and having an outer portion formed to pass over the upper side of the wheel in close proximity thereto; a channel formed in said supporting frame in which said anti-skid element is rotatably mounted; and means for moving said frame, substantially as described.

4. In mechanism of the class described, the combination with a vehicle having a wheel, of a movably mounted annular anti-skid element adapted to encircle said wheel for coöperation therewith; means for moving said element into and out of operative relation with the wheel during travel of the vehicle, said means comprising a transversely movable supporting frame mounted on the vehicle and having an outer portion formed to pass over the upper side of the wheel in close proximity thereto; a channel formed in said supporting frame in which said anti-skid element is rotatably mounted; a manually operable lever; and an operative connection between said lever and said frame whereby the latter may be moved through actuation of said lever substantially as described.

5. In mechanism of the class described, the combination with a vehicle having a wheel, of a movably mounted anti-skid element adapted for coöperation with the wheel, said element comprising a transversely movable annular member adapted to encircle the wheel; and a plurality of spaced radially disposed flexible members connected at their outer ends with said annular member and adapted to be moved into and out of engagement with the tread portion of the wheel through actuation of said annular member, substantially as described.

6. In mechanism of the class described, the combination with a vehicle having a wheel, of a movably mounted anti-skid element adapted for coöperation with the wheel, said element comprising a transversely movable annular member adapted to encircle the wheel; a plurality of spaced radially disposed flexible members connected at their outer ends with said annular member and adapted to be moved into and out of engagement with the tread portion of the wheel through actuation of said annular member; and means for actuating said annular member, substantially as described.

7. In mechanism of the class described, the combination with a vehicle having a wheel, of a movably mounted anti-skid element adapted for coöperation with the wheel, said element comprising a transversely movable annular member adapted to encircle the wheel; and a plurality of spaced radially disposed flexible chains connnected at their outer ends with said annular member and adapted to be moved into and out of engagement with the tread portion of the wheel through actuation of said annular member, substantially as described.

8. In mechanism of the class described, the combination with a vehicle having a wheel, of a movably mounted anti-skid element adapted for coöperation with the wheel, said element comprising an annular member adapted to encircle the wheel and to rotate in unison therewith and adapted for movement transversely of the wheel; a plurality of spaced radially disposed flexible members connected at their outer ends with said annular member and adapted to be moved into and out of engagement with the tread portion of the wheel through transverse movement of said annular member; and a rotatably mounted member concentrically arranged relatively to the wheel, with which the inner ends of said flexible members are connected, substantially as described.

9. In mechanism of the class described, the combination with a vehicle having a wheel, of a movably mounted anti-skid element adapted for coöperation with the wheel, said element comprising an annular member adapted to encircle the wheel and to rotate in unison therewith and adapted for movement transversely of the wheel; a plurality of spaced radially disposed flexible members connected at their outer ends with said annular member and adapted to be moved into and out of engagement with the tread portion of the wheel through transverse movement of said annular member; a rotatably mounted member concentrically arranged relatively to the wheel, with which the inner ends of said flexible members are connected; and means for operatively connecting said last mentioned rotatable member with the wheel to rotate in unison therewith, substantially as described.

10. In mechanism of the class described, the combination with a vehicle having a wheel, of a movably mounted anti-skid element adapted for coöperation with the wheel, said element comprising an annular member adapted to encircle the wheel and to rotate in unison therewith and adapted for movement transversely of the wheel; a plurality of spaced radially disposed flexible members connected at their outer ends with said annular member and adapted to be moved into and out of engagement with the tread portion of the wheel through transverse movement of said annular member; a rotatably mounted member concentrically arranged and axially movable relatively to the wheel to which the inner ends of said flexible members are connected; means for simultaneously shifting said before-mentioned annular member and said last mentioned rotatable member; and means for operatively connecting said last mentioned member with the wheel to rotate in unison therewith, when said member is moved toward the wheel, substantially as described.

11. In mechanism of the class described, the combination with a vehicle having a wheel, of a movably mounted anti-skid element adapted for coöperation with the wheel, said element comprising an annular member adapted to encircle the wheel and to rotate in unison therewith and adapted for movement transversely of the wheel; a plurality of spaced radially disposed flexible members connected at their outer ends with said annular member and adapted to be moved into and out of engagement with the tread portion of the wheel through transverse movement of said annular member; a rotatably mounted member concentrically arranged and axially movable relatively to the wheel to which the inner ends of said flexible members are connected; means for simultaneously shifting said before-mentioned annular member and said last mentioned rotatable member; and teeth on said wheel and said last mentioned member adapted, when said member is moved toward the wheel, to interlock and operatively connect said member with the wheel, substantially as described.

12. In mechanism of the class described, the combination with a vehicle having a wheel, of a movably mounted anti-skid element adapted for coöperation with the wheel, said element comprising a transversely movable annular member adapted to encircle the wheel; a plurality of spaced radially disposed flexible members connected at their outer ends with said annular member and adapted to be moved into and out of engagement with the tread portion of the wheel through actuation of said annular member; and means for taking up the slack in said radially disposed members when said members are moved out of engagement with the tread portion of the wheel, substantially as described.

13. In mechanism of the class described, the combination with a vehicle having a wheel, of a movably mounted anti-skid element adapted for coöperation with the wheel, said element comprising a plurality of radially disposed flexible members, each of said members being normally slack permitting of the outer end portion thereof being carried across the tread portion of the wheel during travel of the vehicle; and means for taking up the slack in said members when the same are moved to inoperative position, substantially as described.

14. In mechanism of the class described, the combination with a vehicle having a wheel, of a movably mounted anti-skid element adapted for coöperation with the wheel, said element comprising a plurality of radially disposed flexible members, each of said members being normally slack permitting of the outer end portion thereof being carried across the tread portion of the wheel during travel of the vehicle; and means for taking up the slack in said members when the same are moved to inoperative position, said means comprising a stop against which said members are adapted to abut intermediate their ends in the movement of said members to inoperative position, substantially as described.

15. In mechanism of the class described, the combination with a vehicle having a wheel, of a movably mounted anti-skid element adapted for coöperation with the wheel, said element comprising a plurality of radially disposed flexible members, each of said members being normally slack permitting of the outer end portion thereof being carried across the tread portion of the wheel during travel of the vehicle; and means for taking up the slack in said members when the same are moved to inoperative position, said means comprising an annular stop against which said members are adapted to abut intermediate their extremities in the movement of said members to inoperative position, substantially as described.

16. In mechanism of the class described, the combination with a vehicle having a wheel, of a movably mounted anti-skid element adapted for coöperation with the wheel, said element comprising a plurality of radially disposed flexible members, each of said members being normally slack permitting of the outer end portion thereof being carried across the tread portion of the wheel during travel of the vehicle, said means comprising means engaging with the inner and outer ends of said members for moving the same transversely of the vehicle; and a stationary stop against which the central portions of said members are adapted to engage for taking up the slack therein when said members are moved to inoperative position, substantially as described.

17. In mechanism of the class described, the combination with a vehicle having a wheel, of a movably mounted anti-skid element adapted for coöperation with the wheel, said element comprising a plurality of radially disposed flexible members, each of said members being normally slack permitting of the outer end portion thereof being carried across the tread portion of the wheel during travel of the vehicle, said means comprising means engaging with the inner and outer ends of said members for moving the same transversely of the vehicle; and a stop against which the central portions of said members are adapted to engage for taking up the slack therein and for causing the lowermost of said members to be drawn upwardly out of engagement with the ground, when said members are moved to inoperative position, substantially as described.

18. In mechanism of the class described, the combination with a vehicle having a wheel, of a movably mounted anti-skid element adapted for coöperation with the wheel, said element comprising a plurality of radially disposed flexible members, each of said members being normally slack permitting of the outer end portion thereof being carried across the tread portion of the wheel during travel of the vehicle, said means comprising means engaging with the inner and outer ends of said members for moving the same transversely of the vehicle; and an annular stop against which the central portions of said members are adapted to engage for taking up the slack therein when said members are moved to inoperative position, said stop being eccentrically arranged with the portion thereof closest to the axis of the wheel positioned lowermost, whereby the lowermost of said flexible members will be drawn upwardly out of contact with the ground in the movement of said members to inoperative position, substantially as described.

In testimony whereof I have signed my name to this specification in the presence of two subscribing witnesses.

JOHN A. SPEYER.

Witnesses:
JOSHUA R. H. POTTS,
ARTHUR A. OLSON.